Sept. 16, 1941.　　　E. J. WESTON　　　2,256,366
STEERING GEAR FOR VEHICLES
Original Filed June 10, 1936　　3 Sheets-Sheet 1
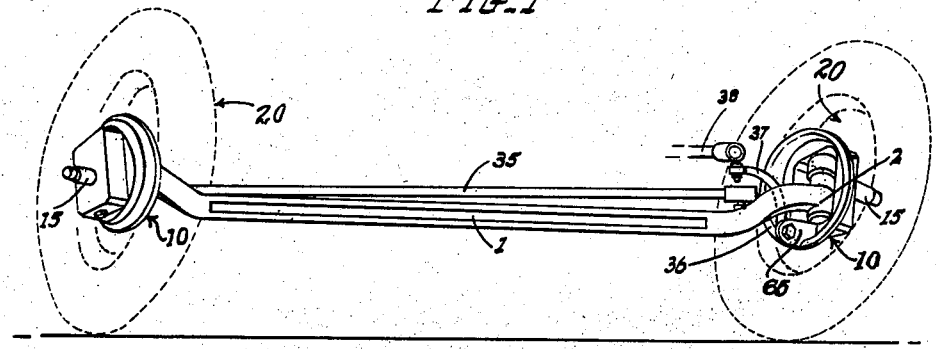
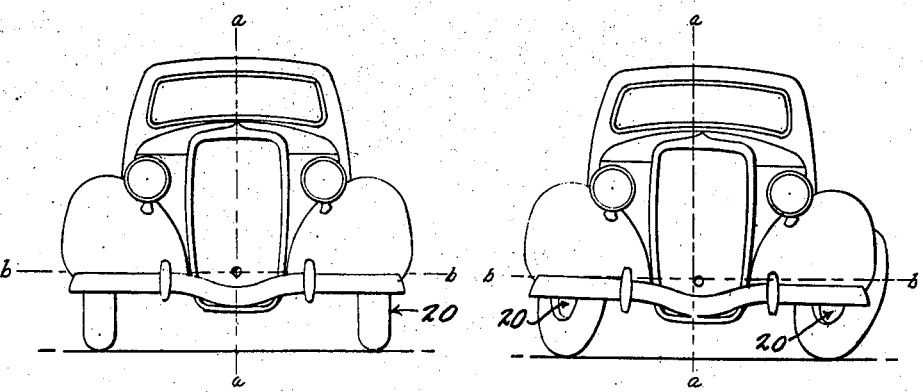
INVENTOR.
BY Edwin J. Weston
Hull, Brock + West
ATTORNEYS.

Sept. 16, 1941.  E. J. WESTON  2,256,366
STEERING GEAR FOR VEHICLES
Original Filed June 10, 1936   3 Sheets-Sheet 2
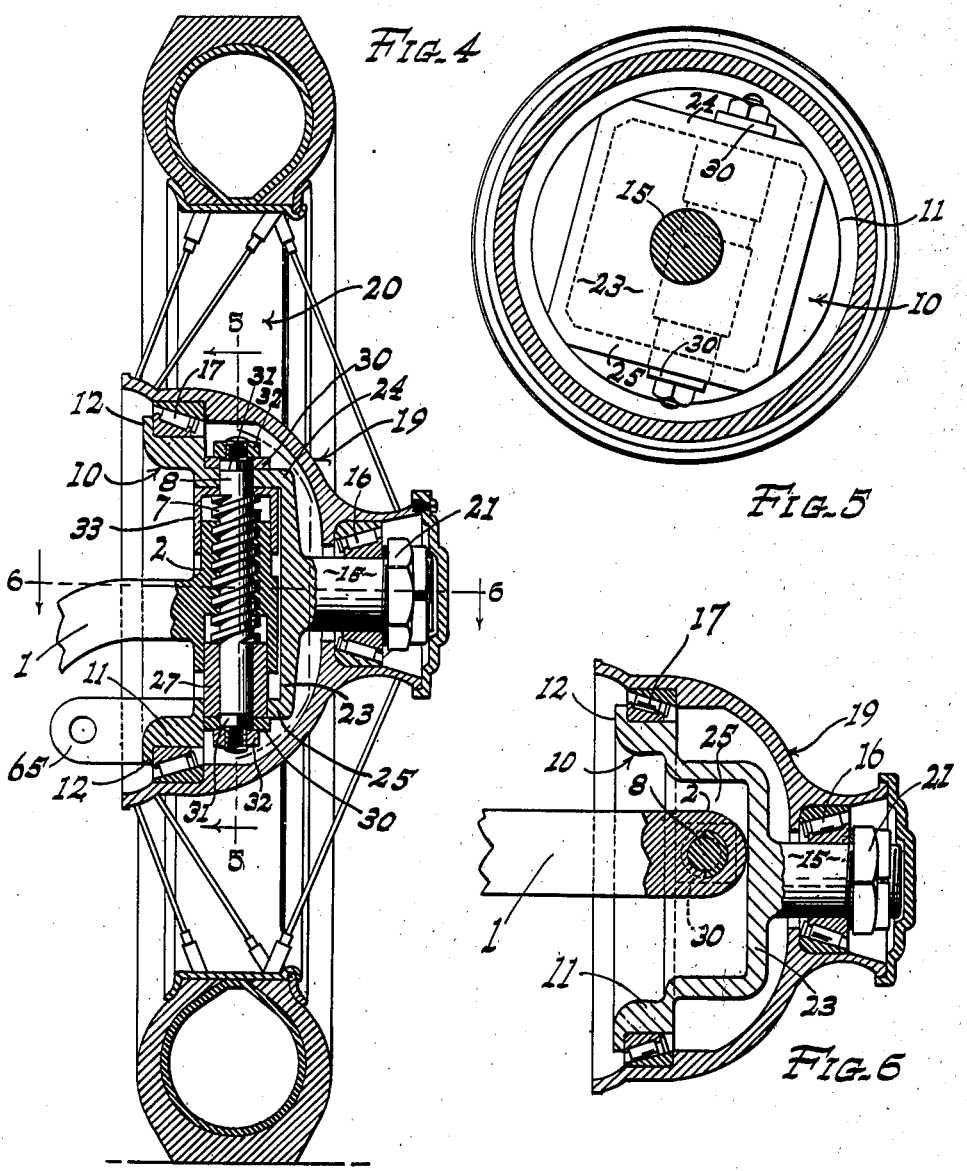
INVENTOR.
Edwin J. Weston
BY Hull, Brock & West
ATTORNEYS.

Sept. 16, 1941.  E. J. WESTON  2,256,366
STEERING GEAR FOR VEHICLES
Original Filed June 10, 1936  3 Sheets-Sheet 3
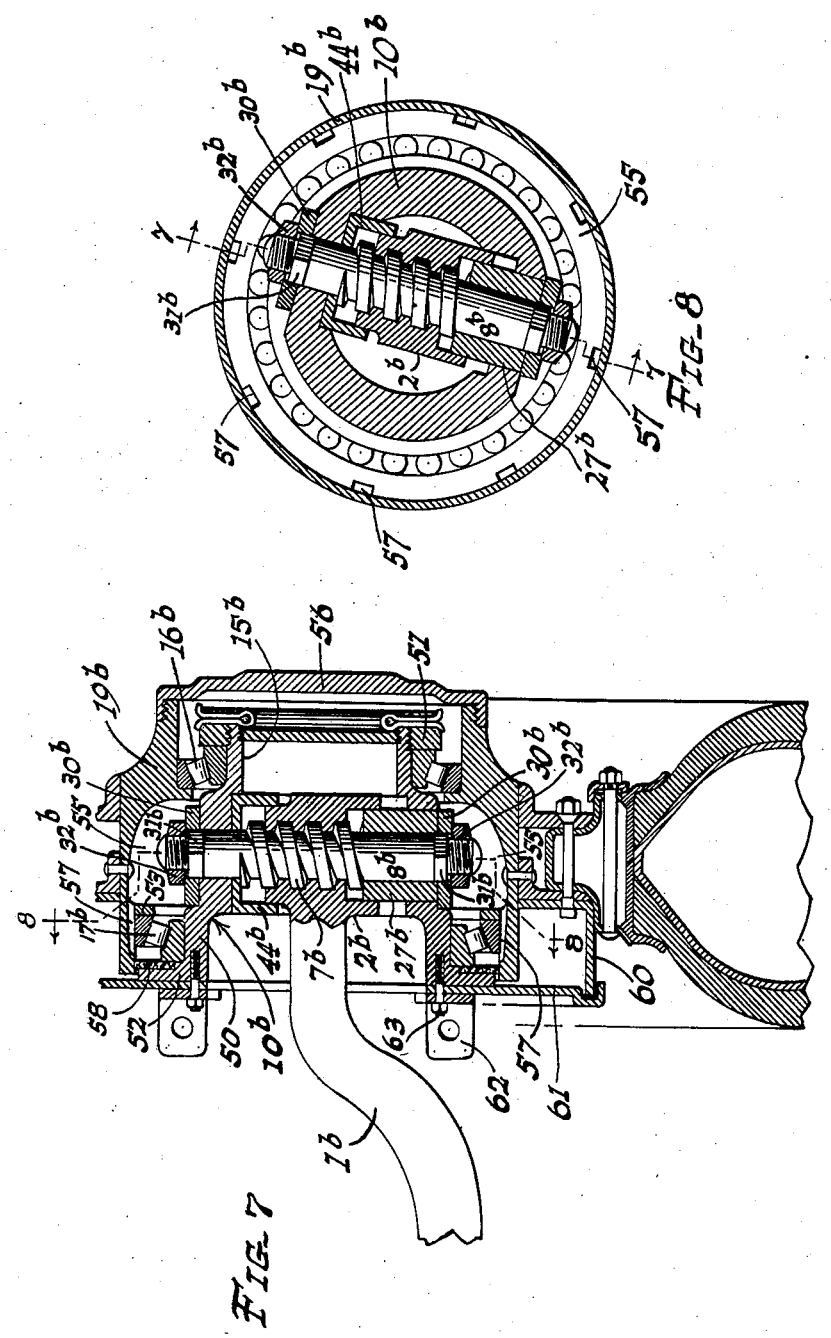
INVENTOR.
Edwin J. Weston
BY Hull, Brock & West
ATTORNEY Patented Sept. 16, 1941

2,256,366

UNITED STATES PATENT OFFICE 2,256,366

STEERING GEAR FOR VEHICLES

Edwin J. Weston, Canton, Ohio

Original application June 10, 1936, Serial No. 84,513. Divided and this application January 31, 1939, Serial No. 253,768

6 Claims. (Cl. 280—95)

This is a division of application Serial No. 84,513, that matured into Patent No. 2,150,199, dated March 14, 1939.

The invention relates to improvements in the steering gear or steering mechanism of automotive vehicles, the term "steering gear or steering mechanism" being used in its broader sense to include generally the articulated connections between the vehicle structure and the front or steering wheels of the vehicle.

The fundamental purpose of the invention is to provide a construction that will greatly improve the steering and riding qualities of the vehicle, promote safety, effect tire economy and result in other advantages hereinafter appearing.

In order to convey an impression of how the invention functions, I may compare the action of the front or steering wheels of a vehicle equipped with my improvements, when rounding a curve, with that of the front wheels of a motorcycle or bicycle, or even with that of a hoop, when negotiating a curve. The wheels tilt perceptibly toward the inner side of the curve, the inner wheel turning over on its side to a somewhat greater extent than the outer wheel. This alone will tend to "bank" the vehicle as it rounds the curve, but such action is further enhanced by the nature of the pivotal connections between the axle ends or wheel mounting parts and the steering knuckles, the ultimate result being an appreciable drop of the inner wheel mounting part or axle end while the outer part or end retains substantially its normal elevation. By reason of these factors, i. e., the wheel tilt and the depression of the inner wheel mounting part or axle end, the front end of the vehicle, and consequently its center of gravity, swings over toward the inner side of the curve immediately upon the wheels being turned. In other words, the front of the vehicle is actually thrown into the turn. This action greatly facilitates negotiating the curve under any speed, and it, and the banking action, very decidedly improve the riding comfort as they tend to overcome the centrifugal force which throws passengers toward the side of the vehicle nearer the outer side of the curve. Likewise, less lateral strain is imposed upon the front wheels, notwithstanding their tilted condition, or upon other parts of the vehicle; and the traction of said wheels is increased by the resultant direction of their lines of force upon the road.

By the swing of the vehicle into the turn, as above expressed, and the wheels lying over (in the manner of a hoop, or the wheels of a wheelbarrow, when deflected from a straight course) so as to naturally influence the mass of the load to assume a curved course, there is less tendency than in the case of the prevailing steering gear for the vehicle to continue in a straight line and consequently slippage of the driving wheels is eliminated and their work reduced and the danger of skidding minimized.

The tilting action of the front wheels obviously results in tire economy because it effects a wider distribution of wear, utilizing the entire tread surface from side to side, thus causing the tire to last longer. Also, as will hereinafter more fully appear, the rolling action of the tire upon the road when the wheel is being turned to right or left, especially when the vehicle is otherwise still, avoids such wear as that incident to the turning of the wheels under like circumstances when the vehicle is equipped with the usual steering gear. Under prevailing practice, when the wheels are turned while the vehicle is at rest or substantially so, there is a rotary grinding of the bearing portion of the tire upon the road.

One very important feature of my improved construction is the inclination of the pivot pins or so-called "king bolts" of the steering heads downwardly and forwardly with respect to the vehicle structure, together with the offsetting of the spindles of the steering knuckles forwardly of the transverse inclined plane of said pins or bolts so as to produce a pronounced caster effect, like that found in motorcycles and bicycles. This arrangement brings about the action above ascribed to the wheels, such action being realized to its fullest extent when the arrangement includes the standard angular disposition or rearward convergence of the steering arms.

This caster effect, besides facilitating the turning of the wheels under all conditions, results in a tendency of the wheels to automatically resume parallelism after a turn is made and the entire front portion of the vehicle to return to normal position.

The banking of the vehicle beyond that resulting from the tilting of the wheels is effected by screws incorporated in the pivot pins of the steering heads. The pitch of the screw threads of the opposed heads is reversed with respect to each other and is such that the wheel mounting part or end of the axle toward the inner side of the curve will be fed downwardly while the relative movement between the opposite part or axle end and the corresponding screw will be in an upward direction. As a matter of fact, however, the wheel mounting part or axle end toward the outer side of the curve maintains approximately its normal elevation, the feeding upward of such part or end by the screw being compensated for by the tilt of the corresponding wheel. As the parts return to normal condition after a curve has been negotiated, the wheel mounting parts or axle naturally assumes horizontal position, the action seeming almost automatic, as above intimated.

In the embodiments of the invention herein illustrated, the pivot pin is disposed in substantially the central vertical plane of the wheel—meaning a plane perpendicular to the rotating axis of the wheel—very much in the order of the common arrangement wherein the axis of the pivot pin coincides with the point of contact between the tire and road. By reason of the action of the wheel that results from the pronounced inclination of the pivot pin and the forward offsetting of the spindle that characterizes the invention, even in the illustrated embodiments the wheel, when it is turned while the vehicle is at rest, rolls upon the supporting surface instead of grinding thereon in the manner above mentioned.

Another object of the invention is to provide a relatively simple but highly efficient lubricating means or system for incorporation in the hub of a wheel for distributing lubricant to the axially spaced bearings thereof.

Objects and advantages additional to those hereinbefore pointed out will appear as I proceed to describe the invention in detail by reference to the accompanying drawings wherein several forms of the invention are illustrated.

In the drawings, Fig. 1 is a front elevation of a front axle assembly incorporating my improvements, the steering knuckles being turned and the wheels, indicated in dotted lines, being tilted; Figs. 2 and 3 are diagrammatic views showing a vehicle in front elevation and illustrating, respectively, its condition when the steering wheels are straight and when they are turned; Fig. 4 is a central vertical section through a wheel and its mounting according to one form of my invention, it being the same as that shown in Fig. 1; Figs. 5 and 6 are sections on the respective lines 5—5 and 6—6 of Fig. 4, and Figs. 7 and 8 are details of an embodiment of the invention especially adapted for heavy duty, this form being shown as incorporating my improved lubricating means or system, each view being a section on the appropriately designated section line of the other view.

While I have disclosed my invention as associated with the old and familiar front axle assembly, it is to be understood that the same is equally well adapted to structures incorporating other types of wheel mounting parts, as to the more modern knee-action constuction, my improvements being concerned more particularly with the articulated connections between the vehicle structure and the front or steering wheels of the vehicle.

In the present illustrative embodiments, the axle consists of the usual forging and its end portions are offset upwardly. In the form of the invention shown in Figs. 1 and 4 to 6, the axle 1 terminates at its opposite ends in cylindrical bosses, the upper ends of which are somewhat reduced in diameter. Where one of such bosses appears in the drawings, it is designated 2. As more clearly illustrated in Fig. 1, the upwardly offset end portions of the axle are twisted slightly so as to incline the axes of the bosses 2 downwardly and forwardly with respect to the vertical plane of the axle. For convenience of illustration, and with respect to all forms, the axes of the bosses or pivotal connections between the ends of the axle and the steering knuckles are vertically disposed, under which circumstances the body portions of the axles are swung rearwardly. It might be well to explain at this point, also, that all views of the drawings, except side elevations and plans, are taken as looking rearwardly from a position in front of the vehicle.

In the form of the invention under consideration—i. e. the one illustrated in Figs. 1 and 4 to 6—the boss 2 on each end of the axle has a bore that is enlarged a distance upwardly from its lower end and is threaded thereabove for cooperation with the threads 7 of the pivot pin or king bolt 8. The inner end portion of the steering knuckle 10 is cylindrical, as shown at 11, and such portion terminates at its inner end in a peripheral flange 12. Offset forwardly from the transverse inclined plane of the axis of the pivot pin 8 is a spindle 15, and mounted upon this spindle, and upon the previously mentioned cylindrical portion 11 of the steering knuckle, through the respective roller bearings 16 and 17, is the hub 19 of a wheel 20, the hub being held against withdrawal from the spindle by a nut 21, in accordance with common practice. The steering knuckle 10 includes a housing 23, the same opening inwardly and accommodating the end of the axle, and projecting from its outer side is the beforementioned spindle 15. The top and bottom walls 24 and 25 of the housing 23 are provided with axially aligned apertures, that of the wall 24 having disposed therein the upper end of the pivot pin 8, while the lower end of a bushing 27 that is applied to the corresponding end of said pin is fitted within the aperture of the bottom wall 25. The upper end of the bushing 27 occupies the enlarged lower end of the bore of the boss 2. Immediately above and below the walls 24 and 25 are locking plates 30 applied to squared portions 31 of the pivot pin, and said plates are clamped between said walls and nuts 32 on the threaded ends of the pin. The locking plates 30 have straight sides that abut against the adjacent transverse wall of the steering knuckle, as indicated in dotted lines in Fig. 6, and this arrangement serves to fix the pin with respect to the steering knuckle so as to cause it to turn therewith. A cylindrical cap 33 is engaged over the correspondingly shaped upper end of the boss 2 and its apertured end wall, through which the adjacent end of the pivot pin extends, is clamped between the wall 24 and the terminal of the thread 7.

Before proceeding to the other forms of the invention herein disclosed, I will describe the operation of the steering gear with reference to the foregoing construction. When the wheels are actuated to make a left turn, as shown in Figs. 1 and 3, the steering knuckle at the right hand end of the axle, as the parts are viewed in the drawings, will rotate on the axis of the corresponding pivot pin 8 in a counterclockwise direction (as looked down upon by the observer from his present position in front of the axle) and in so doing will correspondingly rotate the pivot pin and cause a downward feeding of the boss 2 that is mounted thereon and a depression of the corresponding end of the axle. At the same time, the spindle 15 of said steering knuckle will swing to the rear, assuming an outward and downward inclination, and as a result thereof, the wheel 20 that is mounted on said spindle will lie over somewhat on its side, as clearly shown in Figs. 1 and 3. The pronounced inclination of the wheel, coupled with the feeding downward of the boss 2, lowers the adjacent end of the axle quite perceptibly. With respect to the steering knuckle at the opposite end of the axle, the spindle 15 thereof will swing forwardly to an upwardly inclined position so as to tilt the wheel that is mounted thereon inwardly and rearwardly at the top, but both the inclination and deflection of this wheel will be less than the inclination and deflection of the other because of the customary connections between the opposed wheels, involving the ordinary angular relation or rearward convergence of the steering arms through which, and the tie rod 35, the opposed wheels are operatively connected together. The steering arms and tie rod arrangement is so common and well known, further illustration and description in this connection are deemed unnecessary. The left hand steering arm is shown at 36 in Fig. 1, and associated with it, as a rigid part thereof, is a branch 37 to which is connected the forward end of the usual drag link 38.

In describing the modification of the invention illustrated in Figs. 7 and 8, the same reference numerals that are applied to the parts of the first described form, augmented by the exponent b, will be employed for designating the corresponding parts of the second form. Additional numerals will be introduced as occasion requires to indicate distinctive elements of the modification. It should also be stated that, in the form now to be described, the opposed steering heads are the same with the exception of the pitch of the threads on the pivot pins, those of the opposed pins being reversed with respect to each other.

Figs. 7 and 8 show an embodiment of the invention that is designed for use especially on heavy vehicles, such as trucks, fire apparatus, busses and the like, and with respect to the connection between the steering knuckle and pivot pin is like the first described form. It includes, also, a lubricating feature which, obviously, is applicable to other embodiments of the invention, as well as to hubs generally.

The steering knuckle $10^b$ includes axially spaced cylindrical portions of different diameters, the one of smaller diameter being toward the outer end of the knuckle and constituting the spindle $15^b$, and the other, designated 50, being located adjacent the inner end of the knuckle. A hub $19^b$ is mounted upon said cylindrical portions of the knuckle through roller bearings $16^b$ and $17^b$, the former being held on the spindle $15^b$ by the nut 51, and the other being held against the base of a flange 52 at the inner end of the cylindrical portion 50 by an inwardly extending flange 53 of the hub.

Substantially diametrically opposed parts of the steering knuckle intermediate the spindle $15^b$ and the cylindrical portion 50 are provided with axially aligned openings, the one adjacent the bottom of the knuckle being considerably larger than the one at the top and having disposed therein the lower end of a bushing $27^b$.

The lower end of the pivot pin $8^b$ occupies the bore of the bushing $27^b$, while the upper end of the pin is fitted within the aforesaid opening adjacent the top of the steering knuckle, and the pin is held against turning with respect to the knuckle by the locking plates $30^b$ that cooperate with the squared portions $31^b$ of the pin and are held in place by the nuts $32^b$ that are screwed onto the threaded ends of the pin. Operating upon the thread $7^b$ of the pin is the boss $2^b$ of the axle $1^b$, and the reduced upper end of said boss fits within the cylindrical cap $44^b$ whose annular top wall is clamped between the adjacent portion of the knuckle and the terminal of the thread $7^b$.

A suitable lubricant may be introduced into a relatively large annular lubricant chamber 55 between the hub and steering knuckle upon removal of the hub cap 56. It will be observed that the space occupied by the bearing $17^b$ communicates with the lubricant chamber 55, outwardly beyond the flange 53, through channels 57; and when the wheel is rotating, lubricant that collects in the lower portion of the chamber 55 will be carried upwardly from the sump at the bottom of the chamber and will drain or flow in one direction to the bearing $17^b$ and in the other direction to the bearing $16^b$ so as to keep both bearings well lubricated. I recommend a suitable grease as the lubricant and as the wheel operates the grease becomes heated and liquefies and circulates in the manner above described. A lubricant retainer 58, carried by the flange 52 of the steering knuckle and engaging the inner end of the hub $19^b$, serves to prevent escape of the lubricant from the interior of the hub to the brake drum 60 which is closed by the housing plate 61. A lug 62, for the connection of the steering arm, is fastened, as by studs, one of which is shown at 63, to the inner end of the steering knuckle, the housing plate 61 being disposed between the base of the lug and said end of the knuckle. The steering arms of the previously described form of the invention, one of which is designated 36 in Fig. 1, are connected through lugs with the opposed steering knuckles, the lug corresponding to the arm shown being designated 65 in Figs. 1 and 4.

The action of the wheels in the second described embodiment of the invention is the same as that in the first described form.

Having thus described my invention, what I claim is:

1. In a steering gear for vehicles of the class described, in combination with a vehicle structure, wheel mounting parts extending laterally from the opposite sides thereof, pivot pins threaded intermediate their ends and wherewith said mounting parts have screw connection, steering knuckles incorporating housings encompassing said mounting parts and the top and bottom portions of which are rigidly secured to the pins, said knuckles including spindles, and bearings on the spindles spaced inwardly and outwardly of the vertical planes of said pins for the mounting of the steering wheels of the vehicle, the axes of said pins being inclined downwardly and forwardly and said spindles being offset forwardly from the transversely inclined plane of the axes of said pins.

2. In a steering gear for vehicles of the class described, in combination with a vehicle structure, wheel mounting parts extending laterally from the opposite sides thereof, steering knuckles engaged over the outer ends of said parts, combined screw and pivotal connections between said knuckles and the wheel mounting parts whose axes are inclined downwardly and forwardly, each knuckle including a spindle that is disposed outwardly of said connections and a bearing portion concentric with the spindle and disposed inwardly of said connections, and a wheel having a dished hub encasing each knuckle and axially spaced portions of which have bearing on the spindle and on said bearing portion of the knuckle, the axis of the spindle being offset forwardly from the transverse inclined plane of the adjacent screw and pivotal connections.

3. In a steering gear for vehicles of the class described, in combination with a vehicle structure, wheel mounting parts extending laterally from the opposite sides thereof, a steering knuckle engaged over each of said parts, a threaded pivot pin having screw connection with each of the wheel mounting parts and to the upper and lower ends of which the corresponding knuckle is fastened, each knuckle including a spindle disposed outwardly of said pivot pin and an annular bearing seat in concentric relation to the spindle disposed inwardly of said pin, a wheel having a dished hub encasing each knuckle, an anti-friction bearing disposed between the spindle and the surrounding portion of the hub, and a second anti-friction bearing disposed between the aforesaid annular bearing seat and the surrounding portion of the hub, the axes of the pivot pins being inclined downwardly and forwardly, and the axes of the spindles being offset forwardly from the transverse inclined plane of the pivot pins.

4. In a steering gear for vehicles of the class described, in combination with a vehicle structure, wheel mounting parts extending laterally from the opposite sides thereof, steering knuckles engaged thereover, the outer end of each of said parts having a threaded bore whose axis is inclined downwardly and forwardly, a threaded pivot pin operating within the bore of each of said parts, the upper and lower ends of said pin being locked within opposed parts of the corresponding knuckle, one end of each of the aforesaid bores being enlarged, a bushing engaged at one end within the enlarged end of the bore and at its opposite end having connection with the steering knuckle, a cap cooperating with a portion of the wheel mounting part surrounding the opposite end of the bore and secured to the adjacent part of the steering knuckle, a spindle incorporated in each steering knuckle outwardly of said pivot pin, the knuckle having an annular bearing portion inwardly of said pin in concentric relation to the spindle, and a wheel having a dished hub encasing each steering knuckle and rotatably mounted on the spindle and on said annular bearing portion of the knuckle.

5. In a steering gear for vehicles of the class described, in combination with a vehicle structure, wheel mounting parts extending laterally from the opposite sides thereof, steering knuckles, combined screw and pivotal connections between said knuckles and said wheel mounting parts, the knuckles incorporating spindles, the axes of said screw and pivotal connections being inclined downwardly and forwardly while the axes of said spindles are offset forwardly from the transverse inclined plane of the axes of said connections, wheels having dished hubs, and bearings through which the hubs are mounted on said spindles, a pair of said bearings being associated with, and spaced longitudinally of, each spindle and the parts being so arranged that the axes of said screw and pivotal connections lie intermediate the vertical planes of the bearings of the respective pairs and substantially in the vertical plane of the points of contact between said wheels and the road.

6. In a steering gear for vehicles of the class described, in combination with the vehicle structure, wheel mounting parts extending laterally from the opposite sides thereof, pivot pins threaded intermediate their ends and wherewith said mounting parts have screw connection, said pivot pins being disposed in parallelism with each other and with their axes inclined downwardly and forwardly, steering knuckles comprising housings encompassing said mounting parts and the top and bottom portions of which are rigidly secured to said pivot pins, the steering knuckles incorporating spindles having bearing supporting parts disposed inwardly and outwardly of the vertical planes of said pivot pins, the axes of said spindles being offset forwardly from the transverse inclined plane of the axes of the pivot pins, bearings on the bearing supporting parts of each spindle, and wheels mounted on said bearings, the axes of the pivot pins being disposed substantially in the vertical planes of the points of contact between the wheels and the road.

EDWIN J. WESTON.